United States Patent [19]

Grimes

[11] Patent Number: 5,462,482
[45] Date of Patent: Oct. 31, 1995

[54] AUTOMOBILE DOOR HAVING INTERIOR TRIM PANEL WITH AIR FLOW CONTROL OPENING

[75] Inventor: John A. Grimes, Dover, N.H.

[73] Assignee: Davidson Textron Inc., Dover, N.H.

[21] Appl. No.: 331,852

[22] Filed: Oct. 31, 1994

[51] Int. Cl.$^6$ ................................................ B60H 1/26
[52] U.S. Cl. .................. 454/143; 296/146.5; 296/146.7; 296/154
[58] Field of Search .................. 296/146.1, 154, 296/146.5, 146.6, 146.7; 454/124, 143, 151

[56] References Cited

U.S. PATENT DOCUMENTS

| | | |
|---|---|---|
| 3,392,654 | 7/1968 | Grenier . |
| 3,778,101 | 12/1973 | Tsuda ........................................ 296/154 |
| 3,791,693 | 2/1974 | Hellriegel et al. ......................... 296/146 |
| 3,935,686 | 2/1976 | Dozois ......................................... 52/302 |
| 4,071,273 | 1/1978 | Hack et al. ............................. 296/28 R |
| 4,216,707 | 8/1980 | Pennington . |
| 4,445,721 | 5/1984 | Yaotani et al. .......................... 296/154 |
| 5,040,335 | 8/1991 | Grimes ....................................... 49/502 |
| 5,102,163 | 4/1992 | Ishikawa ........................... 296/146.7 X |
| 5,297,842 | 3/1994 | Hayashi ............................... 296/146.7 |

FOREIGN PATENT DOCUMENTS

| | | | |
|---|---|---|---|
| 1082508 | 5/1960 | Germany ................................ 296/154 |
| 2510721 | 9/1976 | Germany ................................ 296/154 |

*Primary Examiner*—Harold Joyce
*Attorney, Agent, or Firm*—Reising, Ethington, Barnard & Perry

[57] ABSTRACT

An automobile door having an interior trim panel with air flow control openings at a bottom edge thereof. The air flow control openings direct outside air entering the normal drain holes in the door onto the floor of the passenger compartment to thereby prevent this air from entering the passenger compartment through partially sealed openings in the trim panel in which a door release handle and power door and power window switches are received.

6 Claims, 1 Drawing Sheet

AUTOMOBILE DOOR HAVING INTERIOR TRIM PANEL WITH AIR FLOW CONTROL OPENING

TECHNICAL FIELD

This invention relates to automobile doors and more particularly to automobile doors having a drain hole, a trim panel and a manually operated device such as a door release handle that is mounted on the door and is received in an opening in the trim panel that is open to the drain hole.

BACKGROUND OF THE INVENTION

Automobile doors commonly have an interior trim panel with one or more openings in which manually operated devices such as a release handle and power lock and power window switches are received. These doors also commonly have one or more drain holes in their bottom edge for draining water that enters the interior of door past the window seal. These manually operated devices are commonly gasketed with foam at the openings in the trim panel in an effort to prevent outside air entering the drain holes from passing through these openings into the passenger compartment when the passenger compartment pressure falls below atmospheric. However, the sealing effectiveness at these openings in the trim panel is limited because the foam gasket or other sealing means can not be allowed to interfere with the manual operation of the door handle and switches. As a result, these openings are only partially sealed to leave clearance for the operating movement of these devices. And if this sealing clearance is reduced in an effort to minimize the air flow therethrough, there can then develop wind noise which is also undesirable.

As a result, the sealing at these locations is typically a compromise and relatively cold outside air at air flow rates that increase with the differential pressure can flow over the hand of a driver or passenger creating an undesirable condition. For example, this drawing of relatively cold outside air through such partially sealed openings can occur in the winter when the heating system is pulling considerable air from the passenger compartment for recirculation or on a cool night when a sun roof is opened.

Various air flow systems have been proposed for incorporation in an automobile door but they are typically concerned with exhausting air from the passenger compartment to the outside and not with controlling air inflow in any manner associated with the drain holes in the doors or with outside air entering at unsealed areas of the manually operated devices on the doors. Examples of such passenger compartment air exhaust systems in a door are found in U.S. Pat. Nos. 3,392,654 and 3,791,693.

SUMMARY OF THE INVENTION

The present invention is directed to providing an interior door trim panel with an air flow control arrangement that effectively prevents outside air entering a door drain hole from passing into the passenger compartment through an opening in the trim panel in which a manually operated device is received. The present invention accomplishes this in a very cost effective manner by providing one or more air flow control openings in the bottom edge of an interior door trim panel that face downwardly toward the passenger compartment floor at a location adjacent the associated occupant seat. This panel may be a lower section of the trim panel receiving the manually operated device or may be a separate lower panel that combines with an upper trim panel to cover the interior of the door and with the manually operated device then received in an opening in the latter panel. The opening at the manually operated device is elevated above the drain holes at approximately the elbow height of a seated occupant and is normally open to the drain holes through one or more openings in the door's structural inner panel on which the interior door trim panel is mounted. The air flow control openings of the present invention are also open to the drain holes through the same openings in the inner door panel but at a much closer location and at the same elevation as the drain holes. The air flow control openings are provided with a combined flow area that is substantially larger than that of the drain holes and is much larger than that of the unsealed flow area at the manually operated device. When the passenger compartment air pressure falls below the outside air pressure and this pressure differential forces outside air to enter through the drain holes, this outside air is shunted or diverted by the relatively large area air flow control openings toward the passenger compartment floor before it can reach the unsealed flow areas at the manually operated devices. The entering air is thus directed into the passenger compartment at locations where it is not noticed by the vehicle occupants while it equalizes the compartment laterally inward of and pressure with the outside air pressure. The air flow control openings are preferably formed in a peripheral bottom edge of the interior door trim panel so as to not require their coring in the formation of this panel or a later hole forming operation.

It is therefore an object of the present invention to provide a new and improved automobile interior door trim panel having a flow control opening for preventing outside air entering a drain hole in the door from passing into the passenger compartment at a manually operated device mounted on the door and received in an opening in the trim panel.

Another object is to provide a cost effective flow control modification of an automobile interior door trim panel to direct outside air entering a drain hole in the door away from an unsealed area at a manually operated device such as a release handle and a switch received in an opening in the trim panel and instead direct this air onto the floor of the passenger compartment.

Another object is to provide an interior door trim panel having a flow control opening in a bottom portion thereof that faces downward toward the passenger compartment floor and directs outside air entering a drain hole in the door thereto to prevent this outside air from flowing into the passenger compartment through unsealed areas at manually operated devices such as a release handle and power lock and power window switches received in openings in the trim panel.

These and other objects, advantages and features of the present invention will become more apparent from the following description and accompanying drawings wherein:

DETAILED DESCRIPTION OF THE DRAWINGS

Figure 1:
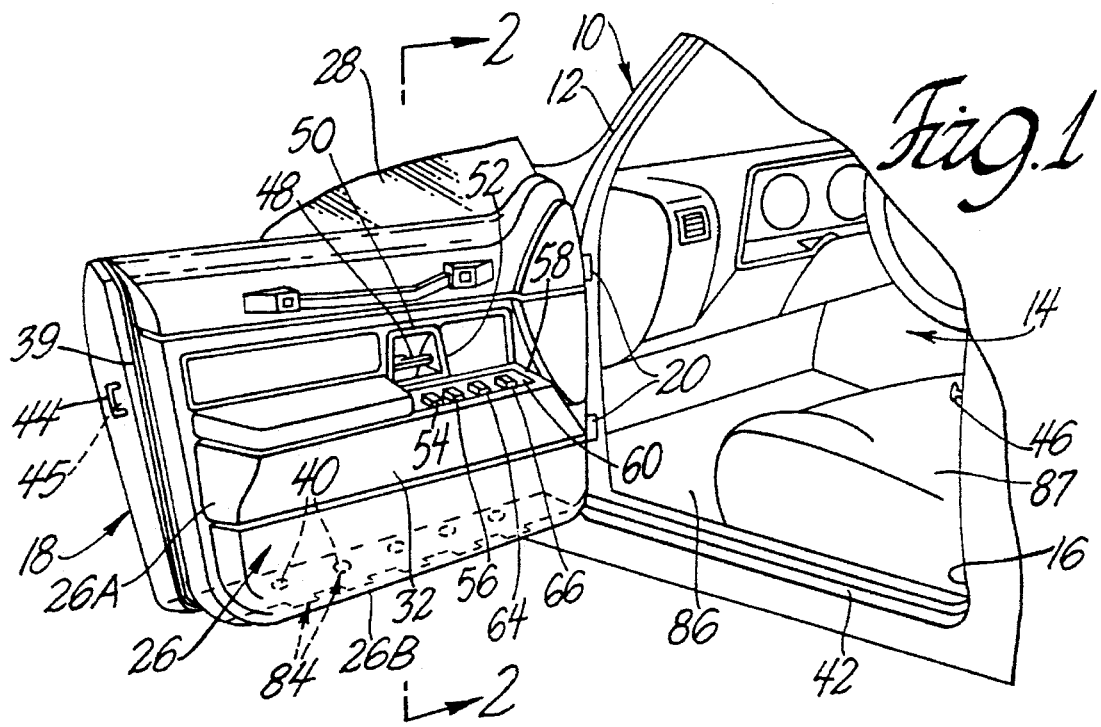
FIG. 1 is a partial perspective view of an automobile having a door with an interior trim panel according to the present invention.

Referring to FIG. 1, there is illustrated an automobile generally designated as 10 comprising a body 12 defining a passenger compartment 14 accessed by a driver-side opening 16 and a passenger-side opening (not shown). A driver-side door 18 is mounted by hinges 20 at a forward edge thereof on the vehicle body and is operable to open and close the opening 16. A passenger-side door (not shown) is similarly mounted on the vehicle body to open and close the passenger-side opening. In the description that follows of the driver-side door, it will be understood that the passenger side door is of similar construction and likewise incorporates an interior trim panel in accordance with the invention.

Figure 2:
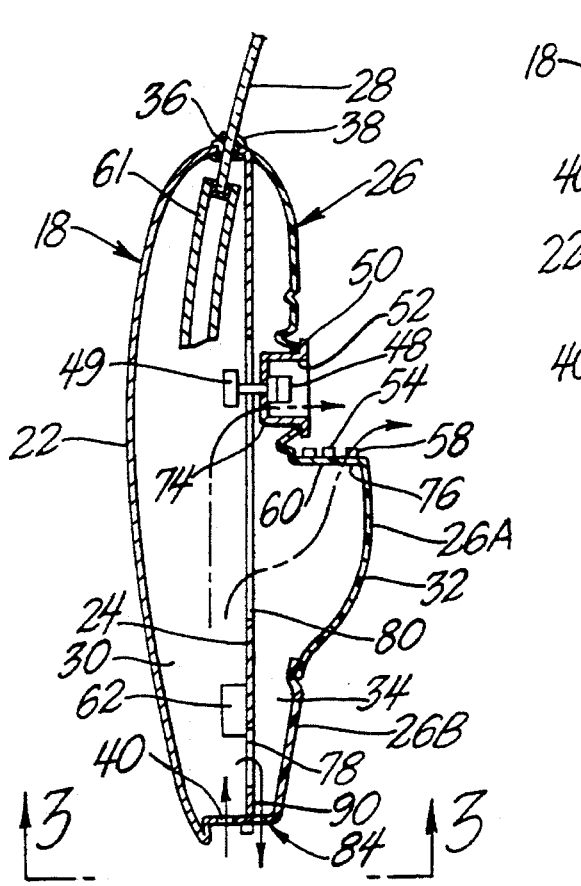
FIG. 2 is an enlarged view taken along the line 2—2 in FIG. 1 when looking in the direction of the arrows.

Referring to FIGS. 1 and 2, the door 18 comprises an outer panel 22, a perforated inner structural panel 24, an interior trim panel 26, and a vertically moveable window 28. The outer and inner panels 22 and 24 are welded together and define a space 30 therebetween below the opening closed by the window 28 wherein the mechanisms for operating the door and the window are mounted. The trim panel 26 closes off the space 30 and provides a pleasing appearance for the interior side of the door. The trim panel 26 may be of one-piece construction or an assembly of panel sections as illustrated including an upper section 26A having an integral arm rest 32 and a lower section 26B that extends to the bottom edge of the door. The trim panel 26 is attached to the inner panel 24 with fasteners (not shown) of a suitable conventional type. The trim panel 26 and the inner door panel 24 also define a space 34 therebetween adjacent the space 30 between the outer and inner door panels. Outer and inner window seals 36 and 38 provide sealing between the window 28 and the respective outer and inner door panels 22 and 24, and a door seal 39 provides sealing between the door and the vehicle body when the door closes the opening 16. The door seal 39 may be mounted on the periphery of the door as illustrated or may be mounted on the vehicle body around the door opening. To drain the bottom of the door space 30 of water getting past the outer window seal 36, a plurality of drain holes 40 are provided in the lower or bottom edge of the door structure formed by the inner door panel 24. The drain holes 40 are spaced along the length of the bottom edge of the door and are located outwardly of the door seal 39 and above the door sill 42 when the door is closed.

The door 18 is secured in its closed position by a latch 44 of a suitable conventional type that includes a power lock mechanism 45. The latch is mounted on the rear edge of the door and engages a striker 46 that in mounted on the vehicle body in the rear edge of the door opening. The latch 44 is manually operated by a release handle 48 that pivots in a recessed mounting plate 50 that is mounted in an opening 52 in the door trim panel 26 above the arm rest 32. The release handle 48 is connected to release the door latch 44 by linkage 49 of a suitable conventional type that is mounted on the inner door panel in the space 30. The power lock for this door and also that for the passenger side door are controlled by separate switches 54 and 56, respectively, that are mounted with a switch plate 58 in an opening 60 in the arm rest 32 on the door trim panel. The window 28 is slidably mounted on guides 61 (only one being shown) that are attached to the inner panel in the space 30 and the window is operated by a power regulator 62 that is also mounted on the inner panel. The power window regulator 62 and that for the passenger side window are controlled by switches 64 and 66, respectively, that are also mounted in the switch plate 58 on the arm rest of the door trim panel.

The door trim panel is of a conventional type of construction and may, for example, be of laminated plastic construction that includes a stiff thermoplastic substrate, a decorative vinyl skin and an intermediate layer of plastic foam. And the lower section of the trim panel may have a carpet cover covering the substrate instead of a layer of vinyl skin and plastic foam. The door release handle 48 and its mounting plate 50 and the switches 54, 56, 64 and 66 and their switch plate 58 are gasketed with foam in the respective mounting openings 52 and 60 in the door trim panel, but not tightly, leaving unsealed openings generally designated as 74 and 76 at these respective locations through which air can pass. The unsealed openings 74 and 76 are open to the drain holes 40 through various openings 78 and 80 in the inner panel 24 provided for the door and window operating mechanisms and for the purpose of lightening the door structure. As a result, outside air entering through the drain holes 40 could flow into the passenger compartment through the unsealed openings 74 and 76 and onto the hand of an occupant operating the door or window or simply resting on the arm rest. The size of these openings is exaggerated in FIG. 2 for illustrative purposes and such undesirable air flow is depicted by the phantom line arrows in this view. The driver-side door structure thus far described and that of the similar passenger-side door is of a conventional type and without the modifications to the door trim panel now to be described, outside air would enter at these sensitive locations when the air pressure in the passenger compartment falls below that of the outside air.

Figure 3:
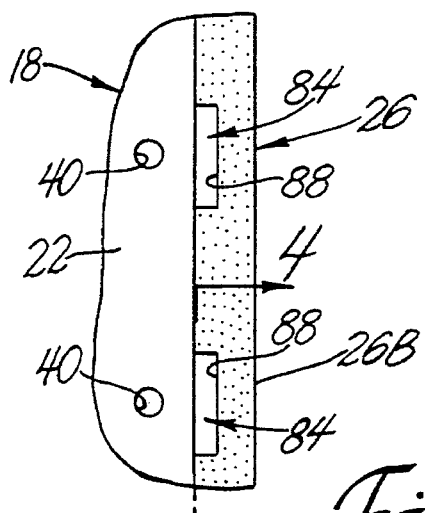
FIG. 3 is a view taken along the line 3—3 in FIG. 2 when looking in the direction of the arrows.
Figure 4:
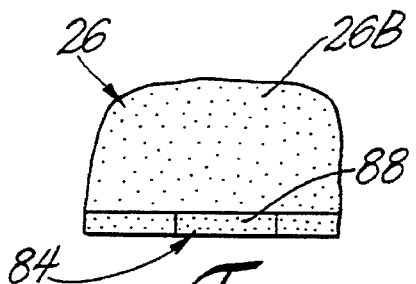
FIG. 4 is a view taken along the line 4—4 in FIG. 3 when looking in the direction of the arrows.

In accordance with the present invention, a plurality of air flow control openings 84 are provided in the bottom edge portion of the door trim panel that face downwardly toward the floor 86 of the passenger compartment adjacent the door sill 42 and inward of the door seal 39 when the door is closed. The air flow control openings 84 are thus located just above the floor adjacent the driver's seat with the door closed. Referring to FIGS. 2–4, the air flow control openings are preferably formed by molding recesses 88 in the lower or bottom edge of the door trim panel 26 that cooperate with a vertical section 90 of the inner door panel to define these openings on the outer side of the inner door panel 24 opposite the drain holes 40. And thus there is no need to core these air flow control openings in the plastic molded trim panel substrate or to form them by cutting holes in a post molding operation.

The air flow control openings 84 are open to the drain holes 40 via the space 34 between the trim panel 26 and inner panel 24 through the same openings 78 and 80 in the inner panel as the unsealed openings 74 and 76 in the latter panel and are provided with a combined flow area that is substantially greater than that of the drain holes 40 (e.g. 50% greater) and much greater than that of the unsealed openings 74 and 76 (e.g. several times that of the latter). Preferably, the air flow control recesses are formed for this purpose with a length that is greater than their depth so as to direct the air in an elongated pattern along the door sill.

When the passenger compartment air pressure falls below the outside air pressure causing the outside air to enter the drain holes 40, the relatively large area of the air flow control openings 84 provides a relatively low resistance to the air flow entering the interior of the door as compared to the unsealed openings 74 and 76 at the door release handle and switches. The air entering the drain holes follows the path of least resistance and as a result is shunted or directed away from the unsealed openings 74 and 76 by the air flow control openings 84 and in a downward direction as illustrated by the solid line arrows toward the floor in the area adjacent the driver's seat where it is not noticed by the occupant. And similarly with respect to the passenger-side door and an occupant in the passenger-side seat. The outside air thus entering unobtrusively at the passenger compartment floor continues until the air pressure in the passenger compartment is equalized with the outside air pressure.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, as a minimum, there may be only one drain hole in the door, only one mounting opening in the trim panel receiving a manually operated device, and only one such air flow control opening which is then sized accordingly in the manner described above to prevent outside air flow from the drain hole from passing through an unsealed portion of the mounting opening. It will also be appreciated that there may not be a seal or gasket providing any sealing for the manually operated devices and that the openings in the trim panel therefor may simply have a close fit therewith that would allow outside air to enter the passenger compartment. It is therefore to be understood that within the scope of the appended claims, the invention may be practiced otherwise than as specifically shown and described.

What is claimed is:

1. In combination, an automobile body having a passenger compartment, said passenger compartment having a floor and a door opening including an imperforate door sill, a door mounted on said body operable to open and close said door opening, said door including an outer door panel and an inner door panel and an interior trim panel and a window that is moveable to open and close a window opening, window seal means providing sealing between said window and said outer and inner door panels, door seal means providing sealing between said door and said vehicle body when said door closes said door opening, said inner and outer door panels defining a space therebetween beneath said window seal means, said interior trim panel mounted on said inner door panel and closing said space, a manually operated device mounted on said inner panel and extending through a mounting opening in said interior trim panel into said passenger compartment and wherein air can pass from said space past said manually operated device and through said mounting opening into said passenger compartment, a drain hole in a lower edge of said door open to said space for normally draining water from said space that enters past said window seal means but also allows outside air to enter into said space when the passenger compartment air pressure falls below the outside air pressure, and said interior trim panel having a downwardly facing air flow control opening located laterally inward of and adjacent said door sill when said door closes said door opening and inward of said door seal means for directing outside air entering said drain hole from said space directly downward toward said passenger compartment floor while assuredly preventing the air entering through said drain hole from reaching said mounting opening and entering said passenger compartment at said manually operated device.

2. A combination as set forth in claim 1 wherein said air flow control opening is located in a bottom portion of said interior trim panel adjacent an occupant seat in the passenger compartment.

3. A combination as set forth in claim 1 wherein said air flow control opening is defined by a recess in a bottom edge of said interior trim panel and by a portion of said inner panel.

4. A combination as set forth in claim 1 wherein said air flow control opening has a flow area that is greater than that of said drain hole and said mounting opening.

5. A combination as set forth in claim 1 wherein said inner panel and said interior trim panel define a space therebetween connecting said first mentioned space with said air flow control opening.

6. A combination as set forth in claim 1 wherein said air flow control opening is elongated in a direction width wise of said door.

\* \* \* \* \*